R. E. L. JANNEY.
CAR COUPLING.
APPLICATION FILED MAR. 22, 1917.
1,404,965.
Patented Jan. 31, 1922.
7 SHEETS—SHEET 2.
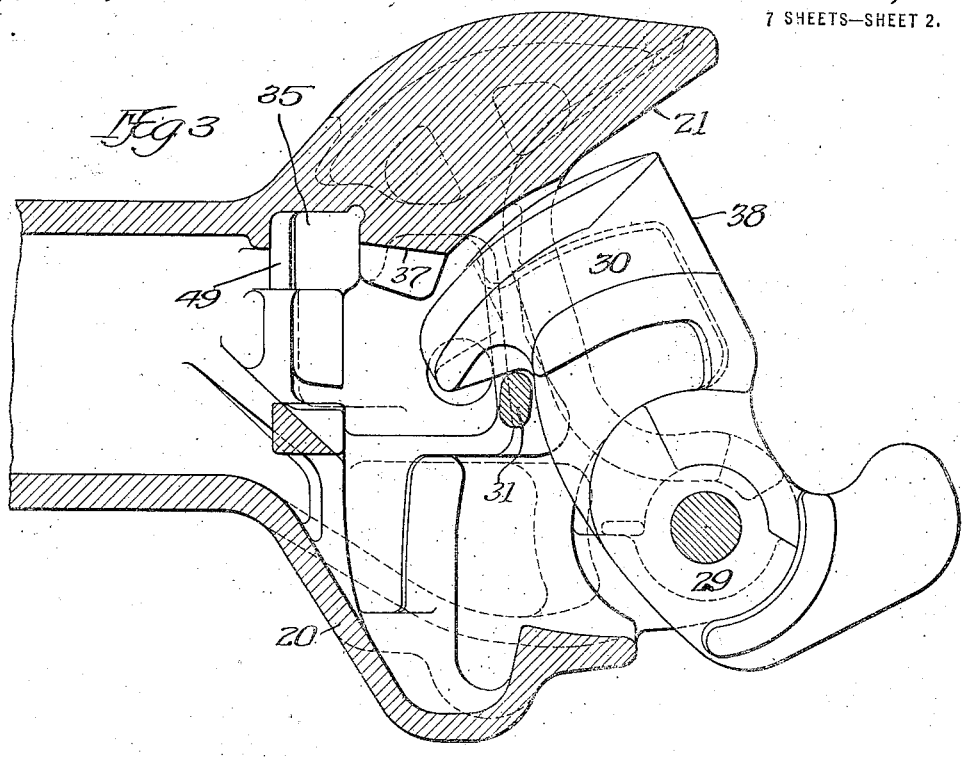
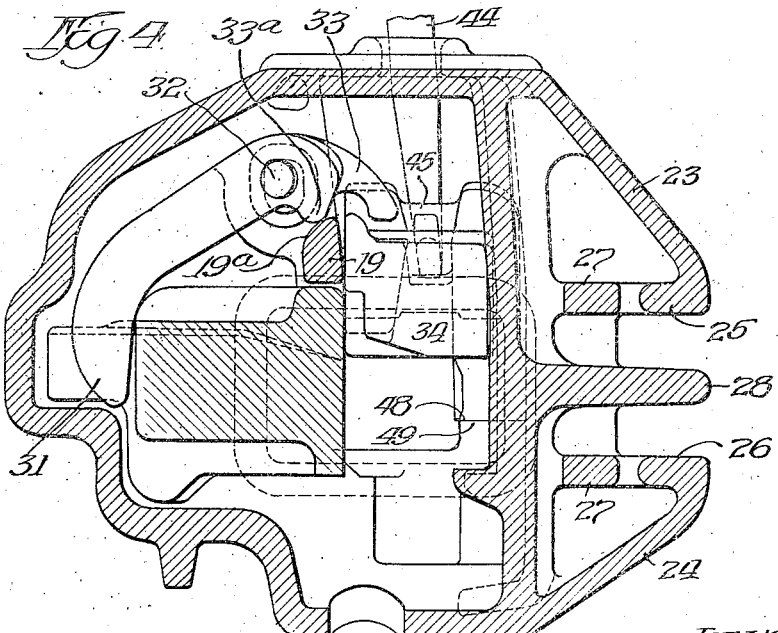

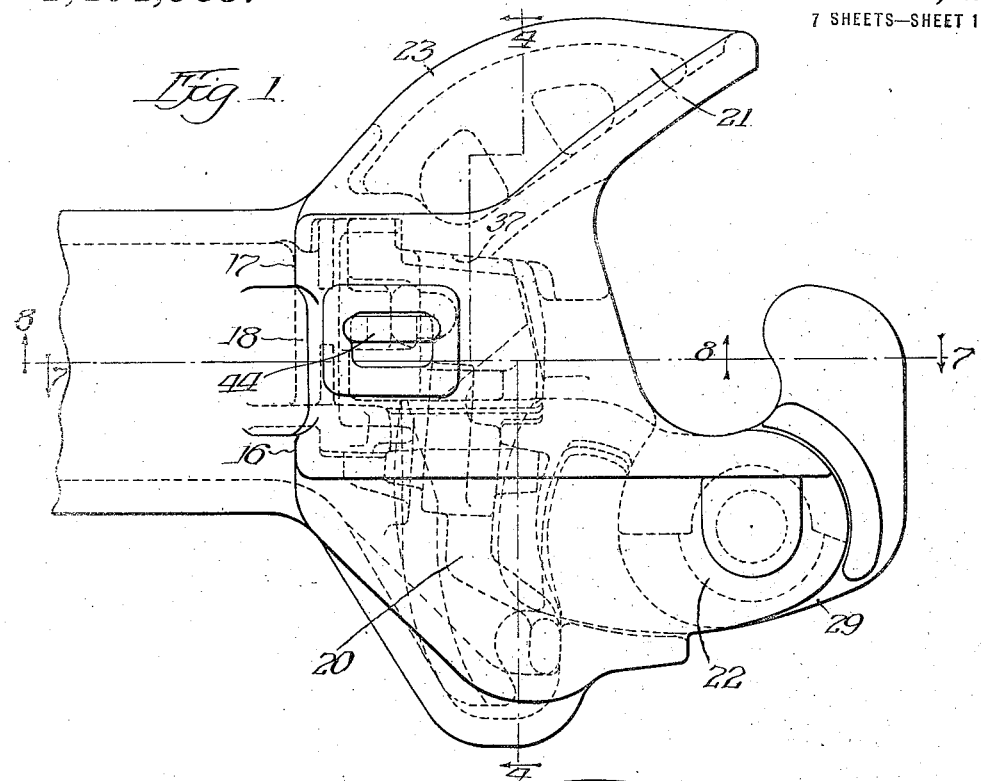

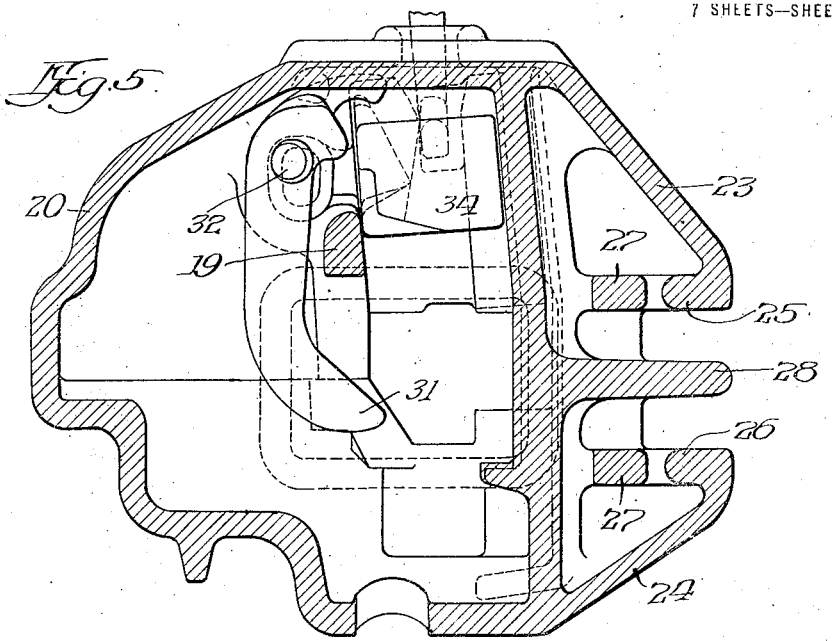
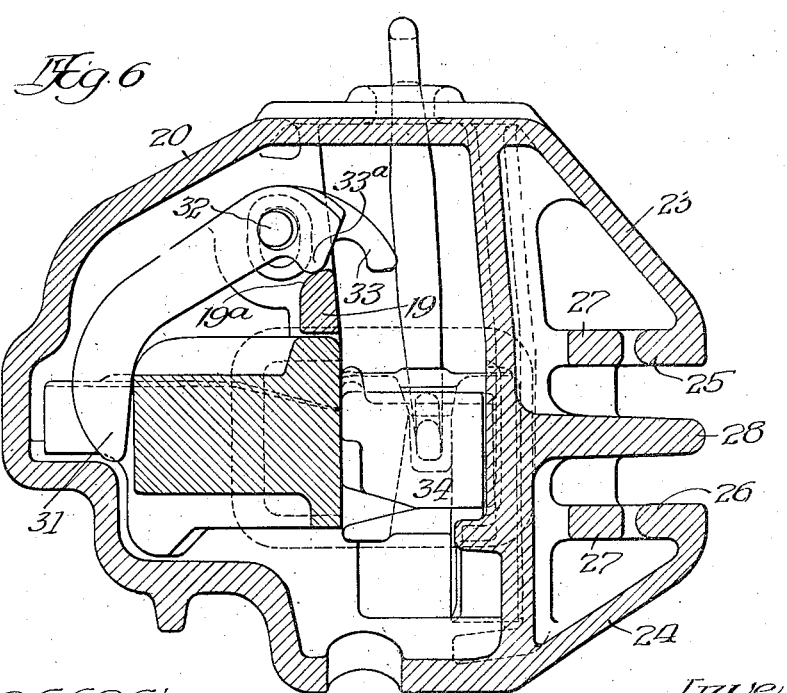

R. E. L. JANNEY.
CAR COUPLING.
APPLICATION FILED MAR. 22, 1917.
1,404,965.
Patented Jan. 31, 1922.
7 SHEETS—SHEET 4.
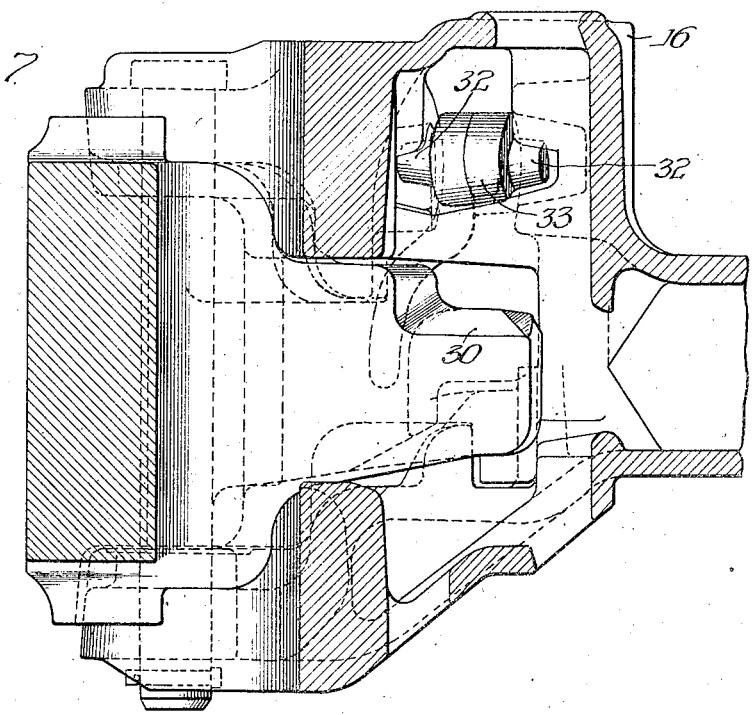
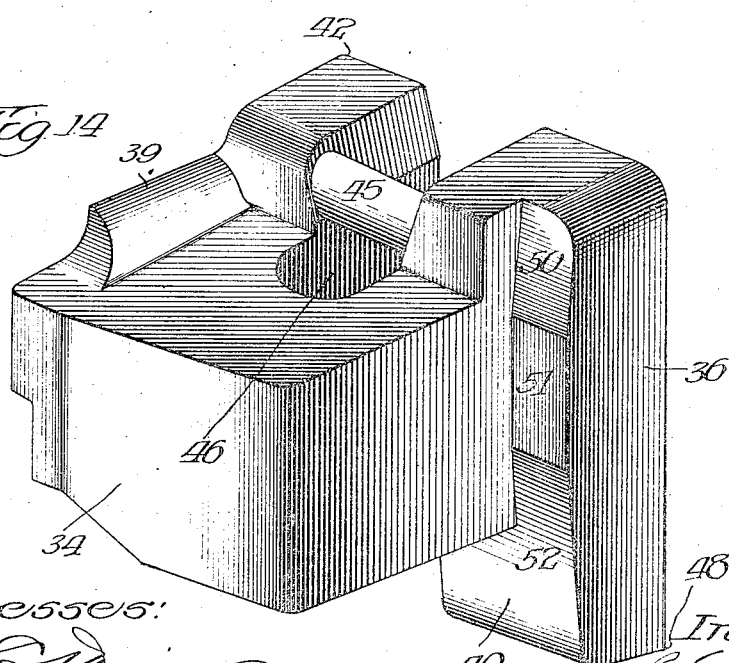

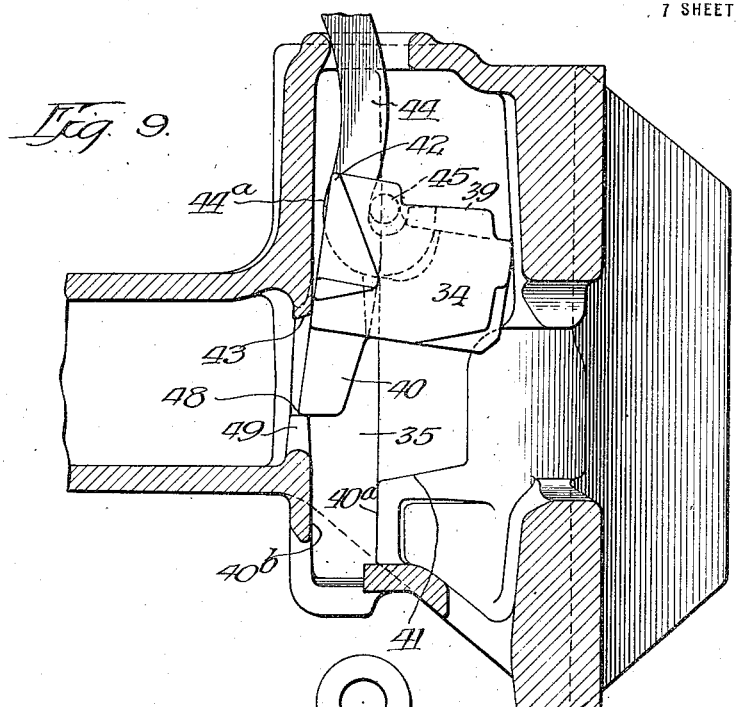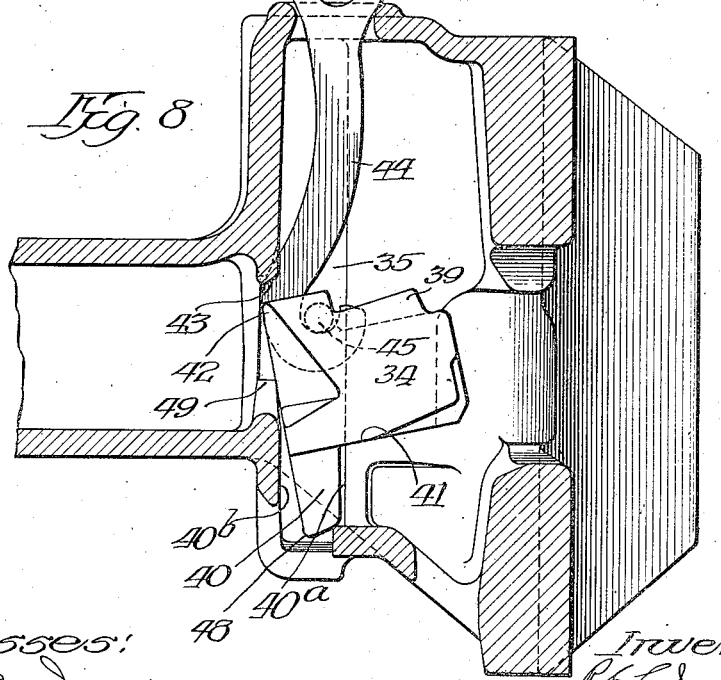

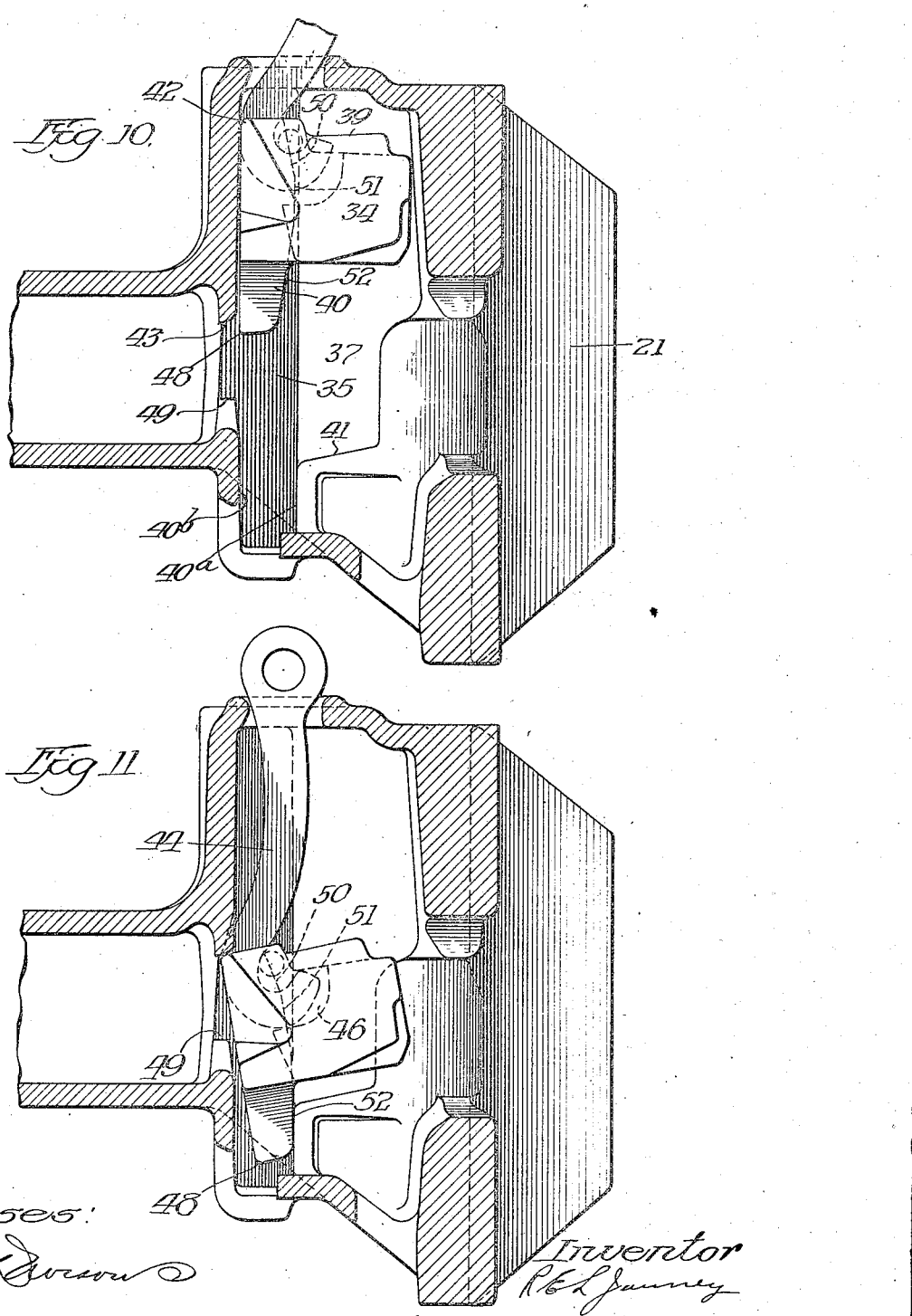

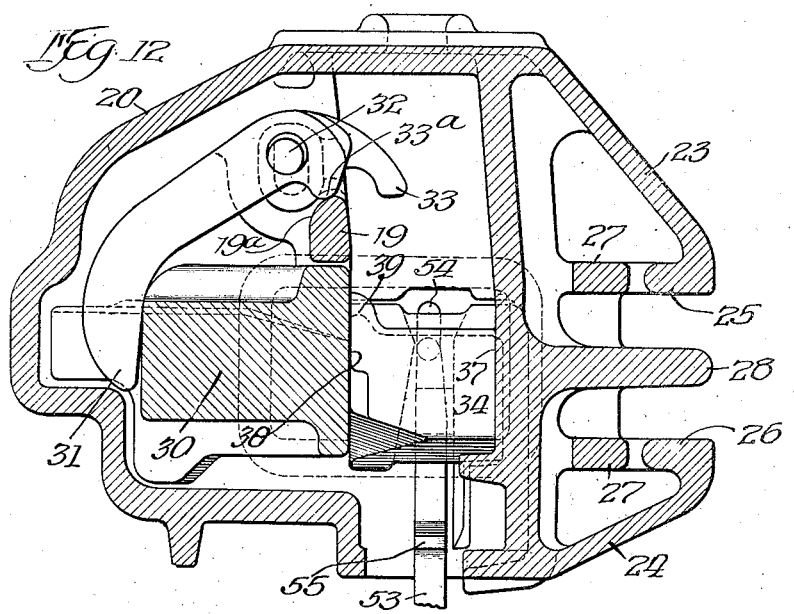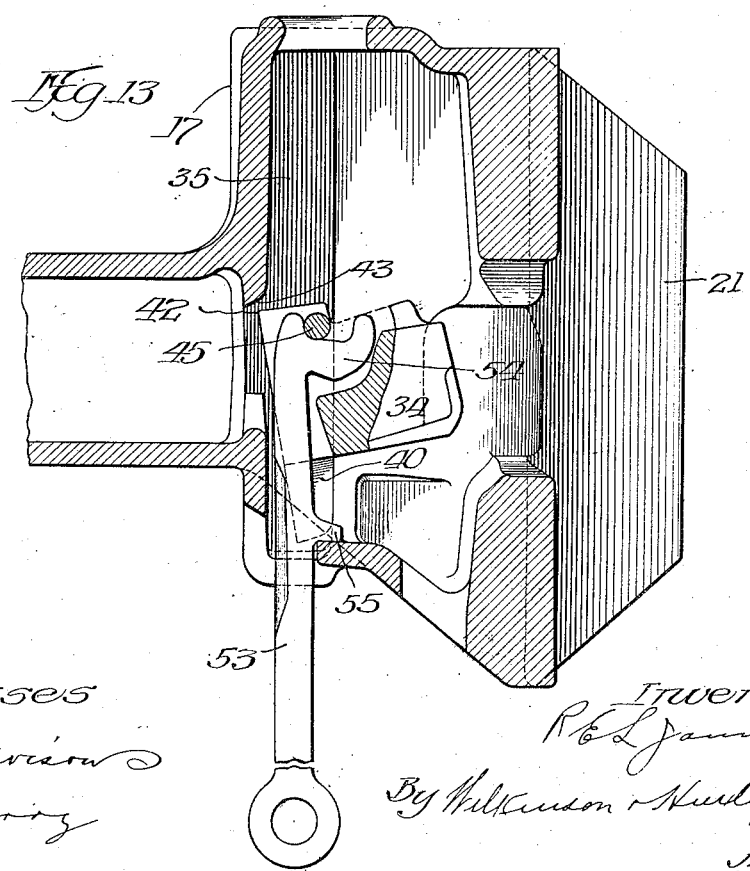

UNITED STATES PATENT OFFICE.

ROBERT E. L. JANNEY, OF CHICAGO, ILLINOIS, ASSIGNOR TO AMERICAN STEEL FOUNDRIES, OF NEW YORK, N. Y., A CORPORATION OF NEW JERSEY.

CAR COUPLING.

1,404,965.　　　　Specification of Letters Patent.　　Patented Jan. 31, 1922.

Application filed March 22, 1917. Serial No. 156,598.

*To all whom it may concern:*

Be it known that I, ROBERT E. L. JANNEY, a citizen of the United States, and resident of Chicago, in the county of Cook and State of Illinois, have invented certain new and useful Improvements in a Car Coupling, of which the following is a specification.

My invention relates to coupling devices and has particular reference to a device of that class having improvements and refinements.

A coupler which will at the present time be acceptable to the users must include, in addition to the coupler head, knuckle and lock, an efficient lock-set, a knuckle throw, and an anti-creep. Many, if not all of the couplers at present in use have these provisions, but to combine them in a coupler so as to insure unfailing operation at all times, and in such manner as to provide the requisite strength, has been found to be difficult.

An object in the construction of the present device is to provide added safeguards whereby the user may be assured of certainty of operation at all times, and the unlikelihood of breakage by jamming or disarrangement of the parts during normal operation.

One of the particular advantages in the present construction is in the provision of a block lock having a guiding member in the form of a projecting leg. While the necessary rocking motion is permitted, the lock is positively prevented from becoming jammed in service.

A weakness in the design of couplers heretofore proposed, in which the knuckle opener is in the form of a suspended bell-crank, has been that the space in the upper portion of the head was likely to be contracted, due to excessive shocks applied either to the buffing face or the horn. The deflection of the walls caused faulty operation of the lock, lifter or knuckle thrower. To overcome this objection I have interposed a rigid strut between the front and rear walls at a point substantially in line with the base of the horn. As this strut is of substantial size in cross section the danger of deflection of these walls is practically eliminated.

A knuckle thrower similar to that shown herein has been illustrated in prior patents owned by my assignee, but improvements in the mounting thereof have been made. For instance, in the present arrangement it is impossible to remove the thrower when the lock is in place. It will also be noted that the thrower is maintained in such a position that it is not contacted by the lock when in lock-set position.

Many of the features disclosed herein were first shown in issued patents and they are useful in those associations. They have, however, increased efficiency in the present arrangement, in which association they are claimed in combination.

The invention will be more readily understood by reference to the accompanying drawing in which, Fig. 1 is a plan view of a coupler constructed in accordance with my invention:

Fig. 2 is a sectional plan view, the top of the head being removed:

Fig. 3 is a similar view showing the knuckle in its open position:

Fig. 4 is a sectional view on the irregular line 4—4 of Fig. 1 showing the lock in lock-set position:

Fig. 5 is a similar view showing the lock in its completely raised position:

Fig. 6 is a similar view showing the lock in its position of rest:

Fig. 7 is a sectional view on the line 7—7 of Fig. 1:

Figs. 8, 9, 10 and 11 are sectional views on the line 8—8 of Fig. 1 showing the lock in its different normal operative positions:

Fig. 12 is a view similar to Fig. 4, showing the application of a bottom lift device:

Fig. 13 is a view similar to Fig. 8 showing the bottom lift device, and,

Fig. 14 is an enlarged perspective view of the lock.

In the drawings the coupler is shown as including a head 20, having a guard-arm 21, and knuckle lugs 22. The guard-arm is composed of a vertical wall or striking face, and diagonally disposed webs 23, 24, projecting from the upper and lower margins of the wall. These converging webs terminate in inturned flanges 25, 26, which are joined to the upright wall by a web 27. An intermediate horizontal web or rib 28 is located between the diagonally disposed web. Between the knuckle lugs 22, the knuckle 29 is mounted. The hub of the knuckle is strongly constructed and is designed in accordance with a number of prior patents owned by my assignee. The tail of the knuckle as best shown in Figs. 2 and 7, is provided with a stepped portion 30, which is slightly arched or rounded, being shaped to co-operate with the lower portion of the lock to cause the unseating of the same from the lock-set during either the opening or closing movement of the knuckle.

In order to avoid distortion of the walls which outline the cavity in the upper portion of the head, I provide a strut 19 which extends horizontally from the front to the back wall substantially in line with the shank. This strut acts as a brace to transmit strains applied to the buffing face to the rear wall at a point near the shank.

As a further means for strengthening the upper portion of the head and avoiding distortion of the horn at the point of engagement with the deadwood, I form a recess 18, (Fig. 1), in the vertical wall which constitutes the striking face of the horn. Or stating it differently, I thicken the wall at points 16, 17, adjacent to the side edges thereof. Thus the force applied to the wall is taken up by the perpendicular walls, no force being transmitted to the unsupported intermediate portion of the rear wall.

The toe 31, of the knuckle thrower, shown in section in Fig. 2, and in elevation in other figures, is adapted to lie within a suitable recess formed in the knuckle tail, the knuckle thrower being in the form of a bell crank having trunnions 32, adapted to be seated within bearings in the upper portion of the head, as best shown in Fig. 7.

The brace 19 has another function as best illustrated in Figs. 4, 5 and 6. It will be noted that the knuckle thrower at a point adjacent to its trunnions is provided with a lug 33ª having a curved extremity adapted to contact the curved upper surface 19ª of the strut 19. Due to the location of the lug the thrower is held in an elevated position when the parts are located for normal operation; that is, as best shown in Fig. 7, the trunnions 32 are retained in the upper end of the vertically elongated bearings. Thus the thrower cannot be accidentally displaced so long as the lock is in its operative positions. The short arm 33 of the knuckle thrower, is as best shown in Figs. 4 and 6, in the form of a hook which overlies a rib or projection on the lock and is adapted to be contacted thereby when the lock is raised.

The lock 34, as best shown in Figs. 2 and 14, is adapted for reciprocation in a vertical guide 35, in the guard-arm side of the head. A lateral projection 36 on the lock co-operates with this groove or guide, the projection being of a less width than the width of the groove in order to permit of limited oscillation of the lock in its guide. The body of the lock lies between the locking face 37 of the head and the locking face 38 of the knuckle. On its upper surface the lock is provided with a curved projection 39, adapted to contact with the hooked-portion 33 of the knuckle thrower. The lock is provided with a depending guiding and lock setting toe 40, which, as best shown in Fig. 8 is guided between the walls 40ª, 40ᵇ. The lock normally rests upon a shelf 41, which projects laterally into the space. In the normal position it will be noted that the upper rear corner 42 of the lock underlies a ledge or portion 43 of the head, this constituting the anti-creep provision. As the lock is lifted from the rear of its center of gravity it will first be rocked from beneath the ledge and will then be free to be lifted.

It will be seen by reference to Figs. 8 and 11 that when the parts are in their normal locked position the curved lower end 44ª of the lifter underlies the back wall or ledge 43, and, therefore, that as the lifter is raised the curved surface acts as a cam to raise the lock from beneath the ledge 43. Of course, during any creeping action of the lock the lifter is not initially raised and therefore there is no tendency for the lifter to act in this manner.

The lock is disengaged from the lifter only by a downward and rearward movement of the lifter relative thereto. In all the normal positions of the lock the lifter is prevented from such movement as would enable its disengagement; this for the reason that the lock rests upon a rigid shelf 41 which projects inwardly from the guard-arm side. It will be apparent therefore that the lifter cannot become disengaged from the lock until the knuckle is removed, the lock moved laterally from engagement with the shelf 41 and then dropped sufficiently to permit the lifter to move rearwardly out of engagement.

The lower rear corner 48 of the lock serves as the lock-set, the same engaging the ledge 49, best shown in Figs. 8 to 11 inclusive. In Fig. 9 the lock is shown as resting on the lock-set ledge.

It will be noted from an examination of the lock that it is provided on the forward face of the rib 36 with three angularly disposed flat surfaces 50, 51, 52. In the position of rest none of these surfaces may be in contact with the wall of the guiding groove. In Fig. 11, however, it is shown that in the anti-creep position the surface 52 is in parallelism with the wall of the groove, while in Figs. 9 and 10 the surfaces 50, 51 are shown in parallelism with the same wall of the groove. This insures ease and certainty of operation.

In the bottom throw arrangement, shown in Figs. 12 and 13, the arrangement of parts is identical with that heretofore described. The lifter 53 is, however, constructed to project through the bottom wall of the head. The upper end of the lifter is provided with a lateral projection 54 which forms a support or ledge for engagement with the transverse pin 45 of the lock. In order to maintain the lifter in proper position when the lock is in the position of Fig. 13, I provide a lateral projection 55 on the lifter which engages with the bottom wall of the head. The act of lifting the lock, placing the same on the lock-set, throwing the knuckle and removing the lock from the lock-set position, is identical with that described in connection with the top lift.

I claim:

1. In a coupler, the combination of a head, a knuckle, a lock, anti-creeping provisions on the lock and head, a lifter, and a cam surface on the lifter adapted to co-operate with the head to first move the lock away from its anti-creep position, substantially as described.

2. In a coupler, the combination of a head, a knuckle, a block-lock having a portion adapted to underlie an anti-creep ledge when creeping has begun, and a lifter having a curved portion adapted to underlie a portion of the head when the coupler is in creeping position, and adapted when the lifter is elevated to force the lock from beneath the anti-creep ledge, substantially as described.

3. A car coupler comprising a head, a shank, a brace in the upper portion of the head and extending from the front wall of the head to the rear wall of the head in substantial alignment with the shank for transmitting strains from the buffing face of the head to the rear wall of the head adjacent the shank, there being a space between the brace and the top of the coupler head to accommodate a knuckle thrower, and there being a space below the brace to accommodate a knuckle tail.

4. In a car coupler, a head having a cavity, a knuckle, a knuckle thrower mounted in bearings in said head, and provided with a lug projecting into said cavity in proximity to said bearings, said lug cooperating with a part of the coupler to prevent accidental removal of said thrower, substantially as described.

5. In a car coupler, a head having a cavity, a brace intersecting said cavity, a knuckle thrower having trunnions mounted in bearings in the upper portion of said head adjacent to said brace, and a side lug on said knuckle thrower adapted to contact with said brace and prevent removal of the thrower from its bearings except when in an abnormal position, substantially as described.

6. In a car coupler, the combination of a head, a knuckle thrower within the head and provided with trunnions, the head being provided with trunnion bearings having lateral openings for the introduction and removal of the trunnions on the knuckle thrower, and means cooperating with a portion of the knuckle thrower to lift the latter into a position with its trunnions above the lateral openings in the bearings when the knuckle thrower is moved to the position it occupies in the locked position of the knuckle.

7. In a car coupler, the combination with a head, a knuckle thrower within the head and provided with trunnions, the head being provided with trunnion bearings having lateral openings for the introduction and removal of the trunnions on the knuckle thrower, and means co-operating with a portion of the knuckle thrower to move the same into a position with its trunnions out of alinement with the lateral openings in the bearings when the thrower is moved to the position it occupies in the locked position of the knuckle.

8. A car coupler having a head, a pivoted knuckle provided with a locking face, a knuckle opening device, a vertically movable lock insertable and removable through the mouth of the coupler head and lying between the locking face of the knuckle and the guard arm side of the coupler head in the locked condition of the coupler, an anti-creep ledge on the head and overlying a portion of the lock in its locking position, the head having a ledge underlying and supporting the lock and preventing tilting thereof in the locking position of the lock, the lock having a limited tilting movement front and rear of the coupler head when unsupported by the ledge to permit disengagement of the lock from the anti-creep ledge, the cooperative relation of the lock and ledge in the locking position of the lock being maintained independently of the knuckle opening device, the lock capable of descending to an abnormal position below the ledge when the knuckle is not within the head, and a lock lifter capable of being connected and disconnected with respect to the lock when the lock is in its abnormal position below the ledge only.

9. A car coupler having a head, a pivoted knuckle provided with a locking face, a knuckle opening device, a vertically movable lock insertable and removable through the mouth of the coupler head and lying between the locking face of the knuckle and the guard arm side of the coupler head in the locked condition of the coupler, an anti-creep ledge on the head and overlying a portion of the lock in its locking position, the head having a ledge underlying and supporting the lock and preventing tilting thereof in the locking position of the lock, the lock having a limited tilting movement front and rear of the coupler head when unsupported by the ledge to permit disengagement of the lock from the anti-creep ledge, the cooperative relation of the lock and ledge in the locking position of the lock being maintained by the knuckle, the lock capable of descending to an abnormal position below the ledge when the knuckle is not within the head, and a lock lifter capable of being connected and disconnected with respect to the lock when the lock is in its abnormal position below the ledge only.

10. A car coupler having a head, a pivoted knuckle provided with a locking face, a knuckle opening device, a vertically movable lock insertable and removable through the mouth of the coupler head and lying between the locking face of the knuckle and the guard arm side of the coupler head in the locking condition of the coupler, an anti-creep ledge on the head and overlying a portion of the lock in its locking position, there being a tongue and groove guiding engagement between the lock and the coupler head, said guiding engagement preventing bodily movement of the lock, but permitting vertical tilting thereof in a direction front and rear of the coupler head to permit disengagement of the lock from the anti-creep ledge, the head having a ledge underlying and supporting the lock and preventing tilting thereof in the locking position of the lock, the cooperative relation of the lock and ledge for preventing tilting of the lock in its locked position being maintained independently of the knuckle opening device, the lock capable of descending to an abnormal position below the ledge when the knuckle is not within the head, and a lock lifter capable of being connected and disconnected with respect to the lock when the lock is in its abnormal position below the ledge only.

11. A car coupler having a head, a pivoted knuckle having a locking face, a knuckle opening device, a vertically movable lock lying between the locking face of the knuckle and the guard arm side of the coupler head in the locked condition of the coupler, said lock being insertable and removable through the mouth of the coupler head, the head having a ledge underlying and supporting the lock in the locking position thereof, the cooperative relation of the lock and the ledge in its locked position being maintained by the knuckle, the lock capable of descending to an abnormal position below the ledge when the knuckle is not within the head, and a lock lifter capable of being connected and disconnected with respect to the lock when the lock is in its abnormal position below the ledge only.

Signed at Chicago, Illinois, this 16th day of March, 1917.

ROBERT E. L. JANNEY.

Witnesses:
A. F. WADE,
T. D. BUTLER.